(12) United States Patent
Wiedemann et al.

(10) Patent No.: US 9,307,795 B2
(45) Date of Patent: Apr. 12, 2016

(54) ANTI-SWAY DEVICE ADAPTER

(75) Inventors: Karl Wiedemann, Middlebury, CT (US); Reed E. Frick, New Haven, CT (US); Noel W. Roberts, Durham, CT (US); Stewart Semeraro, Cromwell, CT (US); James T. Stevens, Cheshire, CT (US); Kevin S. Bogoslofski, Southington, CT (US)

(73) Assignee: THULE SWEDEN AB, Hillerstorp (SE)

( * ) Notice: Subject to any disclaimer, the term of this patent is extended or adjusted under 35 U.S.C. 154(b) by 882 days.

(21) Appl. No.: 13/613,532

(22) Filed: Sep. 13, 2012

(65) Prior Publication Data

US 2013/0243518 A1 Sep. 19, 2013

Related U.S. Application Data

(60) Provisional application No. 61/534,349, filed on Sep. 13, 2011.

(51) Int. Cl.
*B60R 9/10* (2006.01)
*A41D 13/015* (2006.01)
*F16B 7/04* (2006.01)
*B29C 43/18* (2006.01)
*B32B 1/00* (2006.01)

(52) U.S. Cl.
CPC .............. *A41D 13/015* (2013.01); *B29C 43/18* (2013.01); *B32B 1/00* (2013.01); *B60R 9/10* (2013.01); *F16B 7/044* (2013.01); *B29C 2043/182* (2013.01); *Y10T 403/32114* (2015.01); *Y10T 403/42* (2015.01); *Y10T 428/239* (2015.01)

(58) Field of Classification Search
CPC .............. F16B 7/04; F16B 7/044; F16B 9/00; F16B 9/02; F16B 9/023; B60R 9/06; B60R 9/08; B60R 9/10; B60R 9/048; E05D 3/10
See application file for complete search history.

(56) References Cited

U.S. PATENT DOCUMENTS 3,594,853 A * 7/1971 Slattery ..................... E05D 3/10
16/354
3,848,293 A * 11/1974 Marchione ................ E05D 3/10
16/297
5,259,542 A * 11/1993 Newbold ................... B60R 9/06
224/324

(Continued)

FOREIGN PATENT DOCUMENTS

CA 2169574 C 7/2000
CN 201356088 Y 12/2009

(Continued)

OTHER PUBLICATIONS

First Office Action issued Jul. 24, 2015 in Chinese Patent Application No. 201210504703.9.

(Continued)

*Primary Examiner* — Daniel Wiley
(74) *Attorney, Agent, or Firm* — Sterne, Kessler, Goldstein & Fox P.L.L.C.

(57) ABSTRACT

An angled adapter configured for engagement between a carrier-mounted bicycle cradle and a bicycle anti-sway device. The adapter includes an adapter body. The adapter body has a cradle engagement portion at a top end thereof and an anti-sway engagement portion at a bottom end thereof. The adapter body also includes an angled extension portion interconnected between the cradle engagement portion and the anti-sway engagement portion.

15 Claims, 5 Drawing Sheets

(56) References Cited

U.S. PATENT DOCUMENTS

| | | | |
|---|---|---|---|
| 6,286,738 B1 * | 9/2001 | Robins | B60R 9/06 224/314 |
| 6,386,407 B1 * | 5/2002 | Erickson | B60R 9/10 224/282 |
| 6,516,986 B1 * | 2/2003 | Lassanske | B60R 9/048 224/502 |
| 6,616,023 B1 * | 9/2003 | Dahl | B60R 9/048 224/324 |
| 6,988,645 B1 * | 1/2006 | Nusbaum | B60R 9/048 224/324 |
| 7,213,731 B1 * | 5/2007 | Kolda | B60R 9/048 224/42.39 |
| 2010/0051207 A1 * | 3/2010 | Brutsaert | E04F 10/064 160/72 |

FOREIGN PATENT DOCUMENTS

| | | |
|---|---|---|
| DE | 4122823 C2 | 5/1995 |
| JP | 2009214647 A | 9/2009 |

OTHER PUBLICATIONS

English Abstract for CN201356088Y; published on Dec. 9, 2009 and retrieved Oct. 26, 2015.

English Abstract for JP2009214647A; published on Sep. 24, 2009 and retrieved Oct. 26, 2015.

English Abstract for DE4122823A1; published on May 24, 1995 and retrieved Oct. 26, 2015.

* cited by examiner

1

ANTI-SWAY DEVICE ADAPTER

CROSS-REFERENCE TO RELATED APPLICATION

This application claims priority benefit of U.S. Provisional Application No. 61/534,349, filed Sep. 13, 2011, which is fully incorporated by reference herein.

FIELD OF THE TECHNOLOGY

The present disclosure relates generally to a carrier-mounted bicycle cradle and bicycle anti-sway device. More specifically, embodiments within this disclosure relate to an adapter.

BACKGROUND OF THE TECHNOLOGY

Safely and conveniently transporting sports equipment is a concern for many sports enthusiasts. For example, bicycles can be carried on a carrier-mounted bicycle cradle. The carrier can be a hitch-mounted carrier or a carrier configured to be coupled to the rear of a vehicle. The bicycle cradle is used to support a cross tube of a bicycle. The bicycle cradle is typically configured to be mounted on an elongate arm that extends away from the vehicle. Additionally, some carriers include an anti-sway device that is used to further secure the bicycle to the carrier.

BRIEF DESCRIPTION OF THE DRAWINGS

Implementations of the present application will now be described, by way of example only, with reference to the attached figures, wherein.

DETAILED DESCRIPTION

Figure 1:
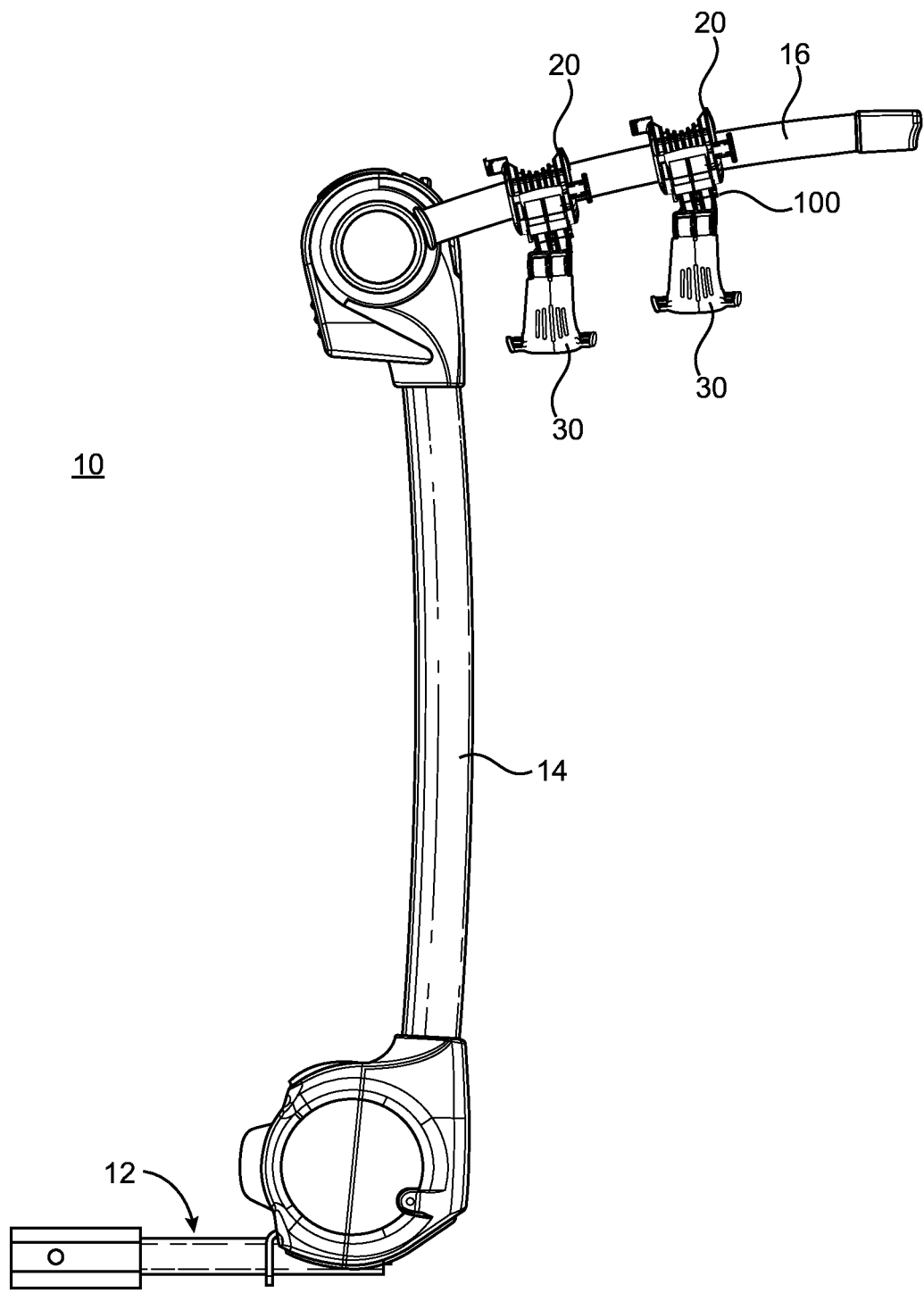
FIG. 1 is an elevational view of a hitch-rack load carrier in accordance with an example embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood by those of ordinary skill in the art that the implementations described herein can be practiced without these specific details. In other instances, methods, procedures and components have not been described in detail so as not to obscure the related relevant function being described. Also, the description is not to be considered as limiting the scope of the implementations described herein.

The present disclosure concerns an adapter that is configured to link two securement devices, such as bicycle cradles and anti-sway devices, together. As described herein the angled adapter is configured for engagement between a carrier-mounted bicycle cradle and a bicycle anti-sway device. While the angled adapter is illustrated as being a separate component from the bicycle cradle and the anti-sway device, the angled adapter could be formed to be integral to one of the bicycle cradle or the anti-sway device. In yet another implementation, the adapter, bicycle cradle and the anti-sway device are all formed as one component. In other implementations, the angled adapter can be comprised of separate pieces. While this description is presented in relation to bicycles and carriers therefore, it can be implemented with respect to other carriers that require a first securement device to hold an object in a first direction and a second securement device to hold the object in a second direction.

Referring to FIG. 1, an example of a carrier in the form of a hitch rack bicycle carrier 10 is illustrated. The hitch rack bicycle carrier 10 includes a stinger 12 for insertion into a hitch-mounted on a carrying vehicle (not shown). The hitch rack bicycle carrier 10 also includes an upright member 14 that couples the stinger 12 to the elongate arm 16. While the illustrated embodiment is of a hitch rack bicycle carrier 10, other bicycle carriers are considered within the scope of this disclosure.

Two cradles 20 are shown being mounted on the elongate arm 16. While only one elongate arm is visible in the illustrated example, a second elongate arm can be present. Each one of the cradles 20 is coupled to an anti-sway device 30. As illustrated, an angled adapter 100 couples the cradle 20 to the anti-sway device 30. The elongate arm 16 as illustrated is curvilinear. When the elongate arm 16 is curvilinear and the anti-sway device 30 is coupled to the cradle 20 so that the cradle 20 and the anti-sway device are substantially aligned such that their respective centerlines are parallel to one another, the bicycle mounted thereto is held in a non-vertical orientation with respect to the gravitational direction. This causes increases stress in the connection between the cradle 20 and the anti-sway device 30 as well as increasing the chance of wear on the bicycle as well as other components of the carrier. The present disclosure illustrates an example of an angled adapter that orients the anti-sway device in a substantially vertical orientation.

Figure 2:
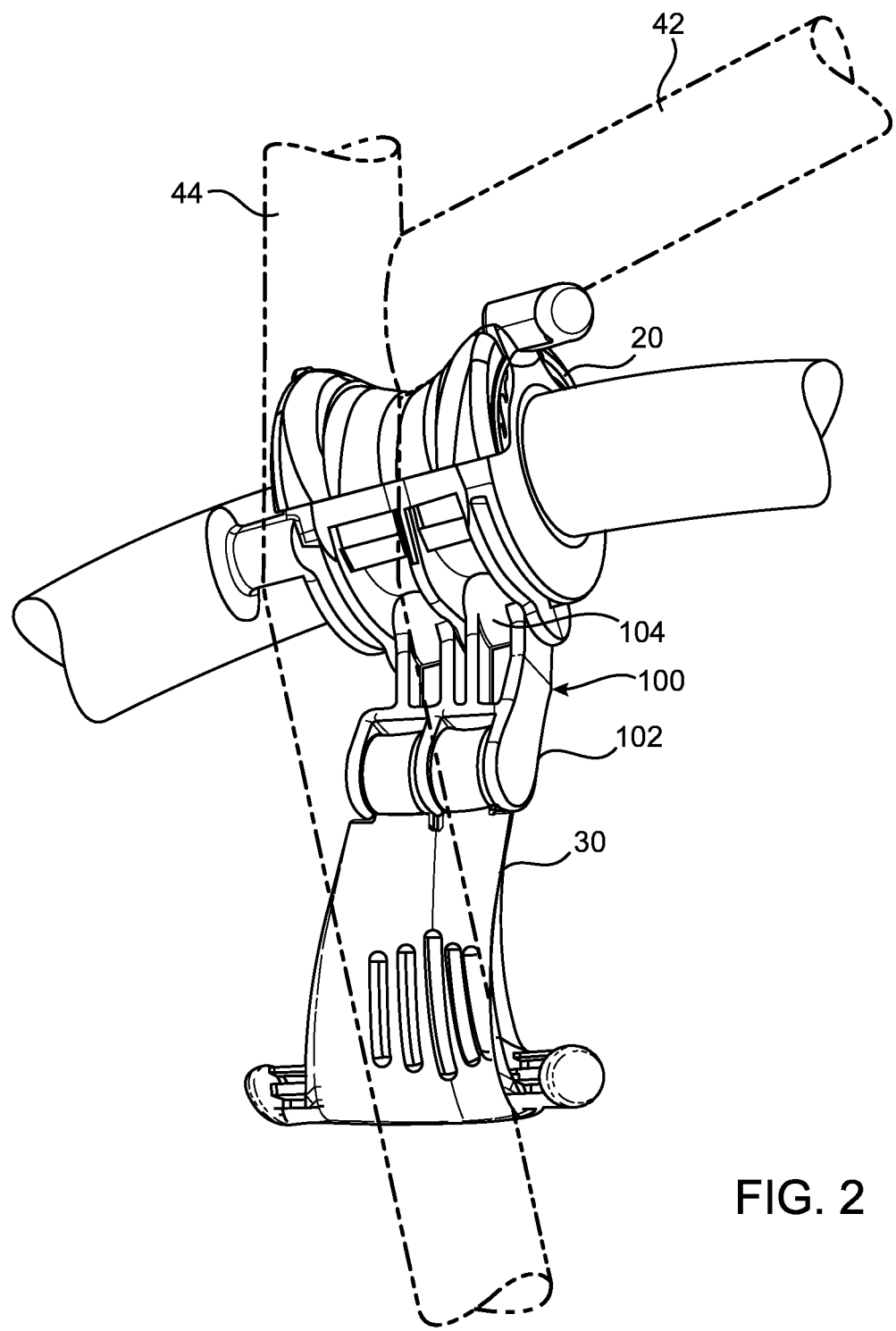
FIG. 2 is an perspective view of carrier-mounted bicycle cradle and a bicycle anti-sway device including an angled adapter in accordance with an example embodiment.

FIG. 2 illustrates a perspective view of the carrier-mounted bicycle cradle and a bicycle anti-sway device. An example of an angled adapter in accordance with the present disclosure is also illustrated. An example of a bike frame 40 is included in phantom. The bike frame includes a top tube 42 and a down tube 44. The top tube rests on the cradle 20 and the anti-sway device 30 is moveable to abut the down tube 44. In other embodiments, the anti-sway device 30 can be coupled to the cradle so that the angle of rotation is about ninety degrees from the angle of rotation as illustrated in FIG. 2. As shown including the angled adapter 100 allows the down tube 44 to be substantially vertically oriented.

Figure 3:
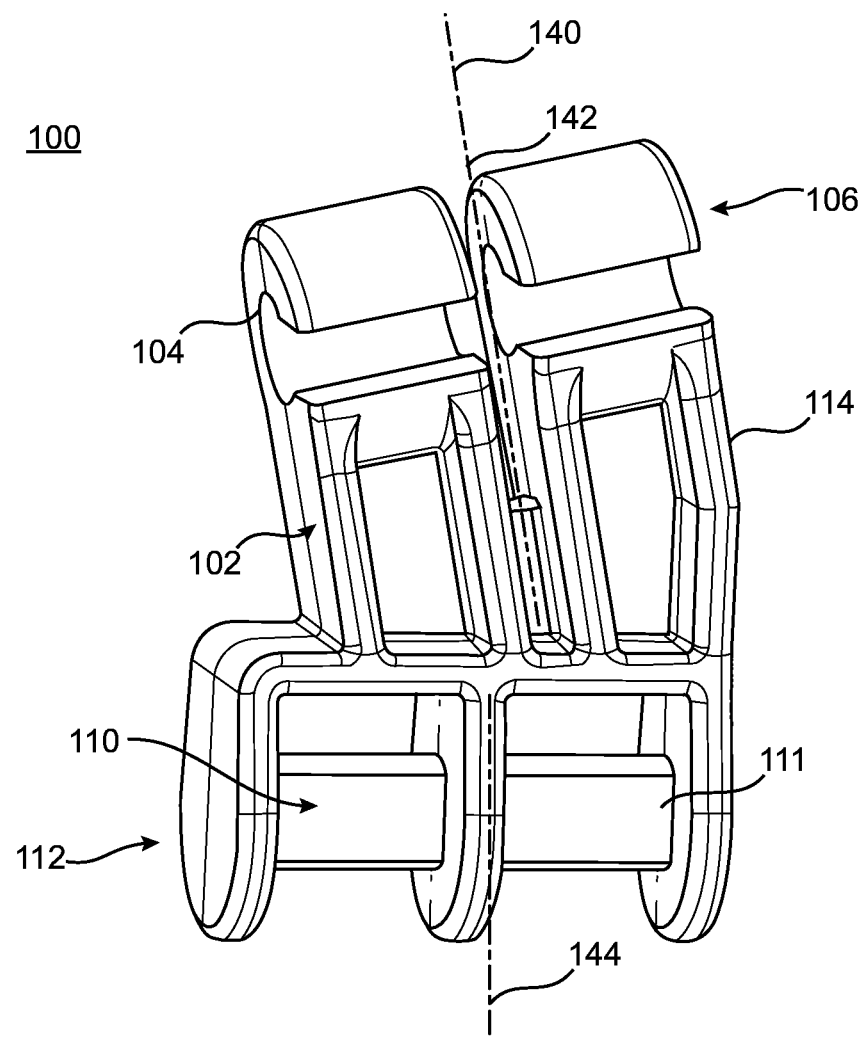
FIG. 3 is an elevational view of an angled adapter in accordance with an example embodiment.

FIG. 3 is an elevational view of an angled adapter 100. The angled adapter 100 is configured for engagement between a carrier-mounted bicycle cradle 20 and a bicycle anti-sway device 30. The angled adapter 100 includes an adapter body 102. The adapter body has a cradle engagement portion 104 at a top end thereof 106 and an anti-sway engagement portion 110 at a bottom end thereof 112. The adapter body 102 includes an angled extension portion 114 interconnected between the cradle engagement portion 104 and the anti-sway engagement portion 110. While the illustrated example of the angled adapter 100 is such that it is a separate component, it can be alternatively configured. For example, the anti-sway engagement portion 110 of the angled adapter 100 can be fixedly interconnected to an engaged anti-sway device 30. In yet another embodiment, the cradle engagement portion 104 can be fixedly interconnected to the bicycle cradle 20. In at least one embodiment the angled adapter 100, bicycle cradle 20 and anti-sway device 30 can be formed as one component. Other configurations are possible as well.

Figure 5:
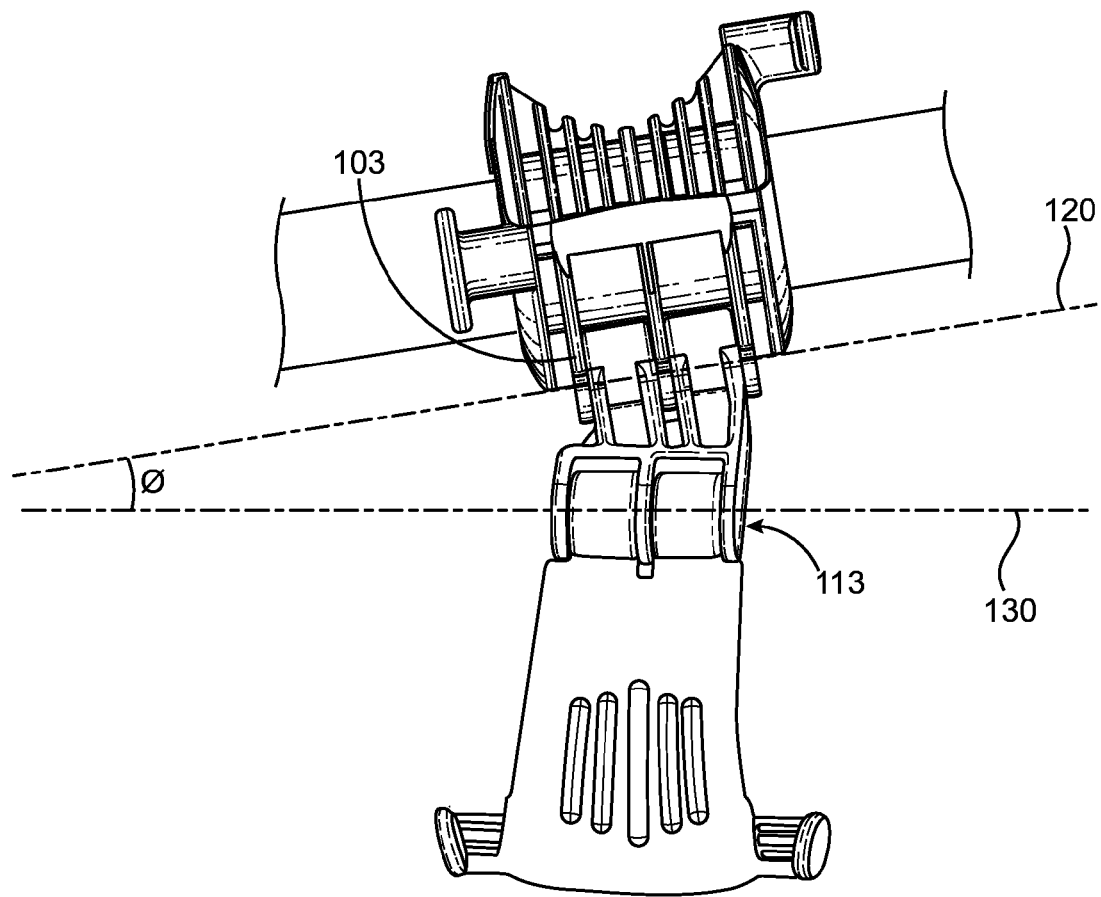
FIG. 5 is an elevational view of carrier-mounted bicycle cradle and a bicycle anti-sway device including an angled adapter in accordance with an example embodiment.

The cradle engagement portion 104 can include a pivot connector 105 for interconnection with a mating pivot connector (103, shown in FIG. 5) on the bicycle cradle 20. As illustrated in FIG. 3, the pivot connector 105 is a hinge connector for interconnection with a mating hinge connector on the bicycle cradle 20. Additionally, the anti-sway engagement portion 110 includes a pivot connector 111 for interconnection with a mating pivot connector (113, as shown in FIG. 5) on an engaged anti-sway device 30. As illustrated in FIG. 3, the pivot connector 111 at the anti-sway engagement portion 110 can be a hinge connector for interconnection with a mating hinge connector on an engaged anti-sway device 30. In at least one embodiment, the cradle engagement portion 104 comprises a pivot connector 105 for interconnection with a mating pivot connector on the bicycle cradle 20 and the anti-sway engagement portion 110 comprises a pivot connector 111 for interconnection with a mating pivot connector on an engaged anti-sway device 30.

The angled extension portion 102 of the adapter 100 can include a non-linear lengthwise central axis 140 extending from the cradle engagement portion 104 to the anti-sway engagement portion 110 and located equidistance between two lateral sides of the angled extension portion 102. As illustrated, the lengthwise central axis 140 comprises a first straight segment 142 at the cradle engagement portion 104 and a second straight segment 144 at the anti-sway engagement portion 110 and wherein the first straight segment 142 and the second straight segment 144 are not parallel. This configuration allows for the adjustment of the angle of the anti-sway device 30 relative to the cradle 20 so that the bicycle can be held in a substantially vertical orientation. In another embodiment, the lengthwise central axis 140 comprises a first straight segment 142 at the cradle engagement portion 104 and a second straight segment 144 at the anti-sway engagement portion 110 and wherein the first straight segment 142 and the second straight segment 144 are obliquely oriented to one another. In at least one embodiment, the first straight segment 142 of the lengthwise central axis 140 at the cradle engagement portion 104 is offset at least five degrees from the second straight segment 144 of the lengthwise central axis 140 at the anti-sway engagement portion 110. In yet another embodiment, the first straight segment 142 of the lengthwise central axis 140 at the cradle engagement portion 104 can be offset at least ten degrees from the second straight segment 144 of the lengthwise central axis 140 at the anti-sway engagement portion 110. In still another embodiment, the first straight segment 142 of the lengthwise central axis 140 at the cradle engagement portion 104 can be offset at least twelve or fifteen degrees from the second straight segment 144 of the lengthwise central axis 140 at the anti-sway engagement portion 110. Other offset angles are possible. As described below, this offset angle accommodates the bicycle so that it can be maintained in substantially a vertical orientation.

Figure 4:
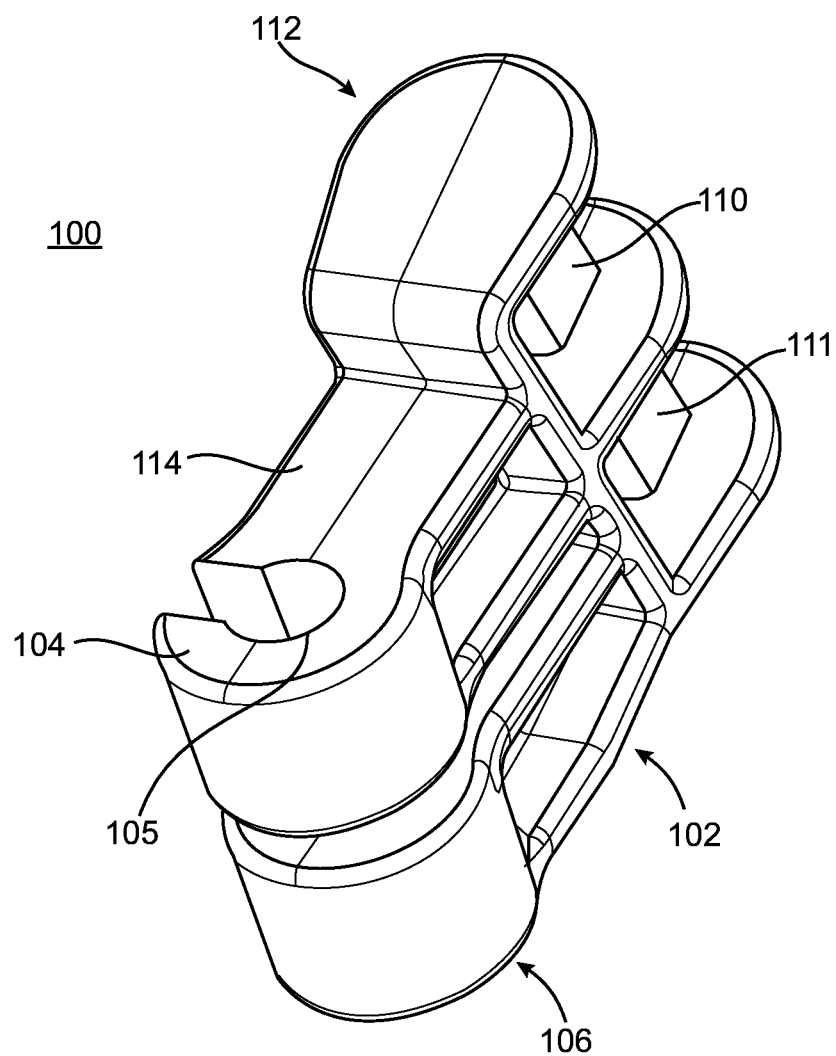
FIG. 4 is a perspective view of an angled adapter in accordance with an example embodiment.

FIG. 4 is a perspective view of an angled adapter 100 in accordance with an example embodiment. The illustrated example in FIG. 4 is the same angled adapter 100 as described in relation to FIG. 3 in a perspective view.

FIG. 5 is an elevational view of carrier-mounted bicycle cradle and a bicycle anti-sway device including an angled adapter in accordance with an example embodiment. In at least one embodiment, the cradle engagement portion 104 comprises a pivot connector 105 for interconnection with a mating pivot connector on the bicycle cradle 20 and the anti-sway engagement portion 110 comprises a pivot connector 111 for interconnection with a mating pivot connector on an engaged anti-sway device 30. Each of the two pivot connectors (105, 111) include a pivot axis (120, 130) and the two pivot axes (120, 130) are obliquely oriented with respect to one another. In one example, the two pivot axes (120, 130) are offset at least five degrees with respect to one another. In another example, the two pivot axes (120, 130) are offset at least ten degrees with respect to one another. The angle θ of the offset can be based upon the angle of the elongate arm 16. In at least one embodiment, the angle θ changes in accordance with the localized position of the cradle 20 along the arm. In yet other embodiments, the angle θ is chosen as an average. In another example the angle θ can be about twelve degrees or fifteen degrees. Other angles are possible.

The cradle engagement portion 104 can include a hinge connector for interconnection with a mating hinge connector 103 on the bicycle cradle 20 and the anti-sway engagement portion 30 includes a hinge connector 113 for interconnection with a mating hinge connector on an engaged anti-sway device 30. The hinge connector for interconnection with a mating hinge connector on the bicycle cradle 20 can define a first rotational axis 120 and the hinge connector for interconnection with a mating hinge connector on an engaged anti-sway device 30 can define a second rotational axis 130, and wherein the first rotational axis 120 and the second rotational axis 130 are obliquely oriented with respect to one another. In at least one implementation, the first rotational axis 120 and the second rotational axis 130 can be offset at least five degrees with respect to one another. In yet another embodiment, the first rotational axis 120 and the second rotational axis 130 are offset at least ten degrees with respect to one another.

Example implementations have been described hereinabove regarding various example embodiments. The example embodiments are intended to constitute non-limiting examples. The subject matter that is intended to be within this disclosure is set forth in the following claims.

The invention claimed is:

1. An angled adapter configured for engagement between a carrier-mounted bicycle cradle and a bicycle anti-sway device, the adapter comprising:
    an adapter body having:
        a cradle engagement portion comprising a pivot connector at a top end thereof configured to pivotably engage the bicycle cradle about an upper pivot axis of the adapter body;
        an anti-sway engagement portion comprising a pivot connector at a bottom end thereof configured to pivotably engage the bicycle anti-sway device about a lower pivot axis of the adapter body; and
        an angled extension portion interconnected between the cradle engagement portion and the anti-sway engagement portion;
        wherein the upper and lower pivot axes are obliquely oriented with respect to one another.

2. The angled adapter as recited in claim 1, wherein the pivot connector of the cradle engagement portion is configured to couple with a mating pivot connector on the bicycle cradle.

3. The angled adapter as recited in claim 2, wherein the pivot connector of the cradle engagement portion is a hinge connector configured to couple with a mating hinge connector on the bicycle cradle.

4. The angled adapter as recited in claim 2, wherein the anti-sway engagement portion is fixedly interconnected to an engaged anti-sway device.

5. The angled adapter as recited in claim 1, wherein the pivot connector of the anti-sway engagement portion is configured to couple with a mating pivot connector on an engaged anti-sway device.

6. The angled adapter as recited in claim 5, wherein the pivot connector of the anti-sway engagement portion is a hinge connector configured to couple with a mating hinge connector on an engaged anti-sway device.

7. The angled adapter as recited in claim 5, wherein the cradle engagement portion is fixedly interconnected to the bicycle cradle.

8. The angled adapter as recited in claim 1, wherein the upper and lower pivot axes are offset at least five degrees with respect to one another.

9. The angled adapter as recited in claim 1, wherein the pivot connector of the cradle engagement portion comprises a hinge connector configured to couple with a mating hinge connector on the bicycle cradle and the pivot connector of the anti-sway engagement portion comprises a hinge connector configured to couple with a mating hinge connector on an engaged anti-sway device.

10. The angled adapter as recited in claim 1, wherein the angled extension portion comprises a non-linear lengthwise central axis extending from the cradle engagement portion to the anti-sway engagement portion and located equidistant between two lateral sides of the angled extension portion.

11. The angled adapter as recited in claim 10, wherein the lengthwise central axis comprises a first straight segment at the cradle engagement portion and a second straight segment at the anti-sway engagement portion and wherein the first straight segment and the second straight segment are not parallel.

12. The angled adapter as recited in claim 10, wherein the lengthwise central axis comprises a first straight segment at the cradle engagement portion and a second straight segment at the anti-sway engagement portion and wherein the first straight segment and the second straight segment are obliquely oriented to one another.

13. The angled adapter as recited in claim 12, wherein the first straight segment of the lengthwise central axis at the cradle engagement portion is offset at least five degrees from the second straight segment of the lengthwise central axis at the anti-sway engagement portion.

14. The angled adapter as recited in claim 12, wherein the first straight segment of the lengthwise central axis at the cradle engagement portion is offset at least ten degrees from the second straight segment of the lengthwise central axis at the anti-sway engagement portion.

15. A bicycle carrier, comprising:
an elongate arm;
a bicycle cradle mounted on the elongate arm;
a bicycle anti-sway device; and
an angled adapter configured to couple the bicycle cradle and the bicycle anti-sway device, the adapter comprising:
an adapter body having:
a cradle engagement portion comprising a pivot connector at a top end thereof configured to pivotably engage the bicycle cradle about an upper pivot axis of the adapter body;
an anti-sway engagement portion comprising a pivot connector at a bottom end thereof configured to pivotably engage the bicycle anti-sway device about a lower pivot axis of the adapter body; and
an angled extension portion interconnected between the cradle engagement portion and the anti-sway engagement portion;
wherein the upper and lower pivot axes are obliquely oriented with respect to one another.

\* \* \* \* \*